United States Patent
Strom

(10) Patent No.: US 7,792,038 B2
(45) Date of Patent: Sep. 7, 2010

(54) METHOD FOR APPLYING STOCHASTIC CONTROL OPTIMIZATION FOR MESSAGING SYSTEMS

(75) Inventor: Robert Evan Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 12/115,742

(22) Filed: May 6, 2008

(65) Prior Publication Data

US 2008/0239951 A1 Oct. 2, 2008

Related U.S. Application Data

(63) Continuation of application No. 11/475,708, filed on Jun. 27, 2006, now abandoned.

(51) Int. Cl.
H04L 12/56 (2006.01)

(52) U.S. Cl. .................... 370/235; 370/230

(58) Field of Classification Search ........... 370/538, 370/238, 416, 230, 235; 709/220, 207, 224; 713/166; 714/4; 726/11
See application file for complete search history.

(56) References Cited

U.S. PATENT DOCUMENTS

| | | | |
|---|---|---|---|
| 5,940,372 A * | 8/1999 | Bertin et al. ........... | 370/238 |
| 5,987,455 A | 11/1999 | Cochrane et al. | |
| 6,118,786 A * | 9/2000 | Tiernan et al. ........... | 370/416 |
| 6,421,359 B1 * | 7/2002 | Bennett et al. ........... | 370/538 |
| 6,510,429 B1 | 1/2003 | Todd | |
| 6,859,438 B2 * | 2/2005 | Haddock et al. ........... | 370/235 |
| 6,983,463 B1 | 1/2006 | Hunt | |
| 7,010,538 B1 | 3/2006 | Black | |
| 2002/0069244 A1 | 6/2002 | Blair et al. | |
| 2003/0067874 A1 * | 4/2003 | See et al. ........... | 370/230.1 |
| 2004/0039786 A1 * | 2/2004 | Horvitz et al. ........... | 709/207 |
| 2005/0010765 A1 * | 1/2005 | Swander et al. ........... | 713/166 |
| 2005/0251556 A1 | 11/2005 | Ginis et al. | |
| 2005/0268146 A1 | 12/2005 | Jin et al. | |
| 2006/0195896 A1 * | 8/2006 | Fulp et al. ........... | 726/11 |
| 2006/0294219 A1 * | 12/2006 | Ogawa et al. ........... | 709/224 |

(Continued)

OTHER PUBLICATIONS

Bhola et al., "Exactly-Once Delivery in a Content-based Publish Subscribe System", 2002, Proceedings of the International Conference on Dependable Systems and Network (DSN'02).

(Continued)

*Primary Examiner*—Kwang B Yao
*Assistant Examiner*—Syed Bokhari
(74) *Attorney, Agent, or Firm*—Yee & Associates, P.C.; Louis J. Percello

(57) ABSTRACT

A computer implemented method, apparatus, and computer usable program code for controlling when to send messages in a stream processing system. A policy is determined by utilizing probability statistics and a cost function prior to stream processing. The policy specifies under which conditions a message is sent eagerly and under which other conditions the message is delayed. A filter is operated during stream processing that selects which of the messages to send from a sending transform based upon a threshold. A controller is operated during stream processing that observes a current state of a receiving transform and that applies the policy based on the current state to determine whether to change the threshold.

20 Claims, 9 Drawing Sheets

U.S. PATENT DOCUMENTS

| | | | |
|---|---|---|---|
| 2007/0116822 A1* | 5/2007 | Prakash et al. | 426/548 |
| 2007/0297327 A1 | 12/2007 | Strom | |
| 2008/0301053 A1 | 12/2008 | Tserkovny et al. | |
| 2009/0187641 A1* | 7/2009 | Li et al. | 709/220 |

OTHER PUBLICATIONS

Babcock et al., "Distributed Top-K Monitoring", SIGMOD 2003, Jun. 2003, San Diego, CA, ACM 1-58113-634X/0306, pp. 1-12.

Bertsekas, "Dynamic Programming and Optimal Control", vol. II, Athena Scientific, 1995, pp. 184, 186, 203, 204, and 207.

Hwang et al., "A Comparison of Stream-Oriented High-Availability Algorithms", Brown University, http://www.cs.brown.edu/publications/techreports/reports/CS-03-17.html, Sep. 2003, pp. 1-13.

Madden et al., "Fjording the Stream: An Architecutre for Queries over Streaming Sensor Data", Proceedings of the 18th International Conference on Data Engineering, Jun. 26, 2001, pp. 1-25.

Gehrke et al., "On Computing Correlated Aggregates Over Continual Data Streams", Proceedings of the 2001 ACM SIGMOD International Conference on Management of Data, May 21-24, 2001, 12 pages.

Babu et al., "Continuous Queries over Data Streams", Stanford University, vol. 30, Issue 3, Sep. 2001, 12 pages.

Datar et al., "Maintaining Stream Statistics over Sliding Windows", Stanford University, Proceedings of the thirteenth annual ACM-SIAM Symposium on Discrete Algorithms, ISBN: 0-89871-513-X, Jul. 30, 2001, pp. 1-10 and Appendix i-ii.

Babcock et al., "Models and issues in Data Stream Systems", Proceedings of the twenty-first ACM SIGMOD-SIGACT-SIGART Symposium on Principles of database systems, Mar. 9, 2002, pp. 1-30.

Carney et al., "Monitoring Streams-A New Class of DBMS Applications", Technical Report CS-02-1, Department of Computer Science, Brown University, Feb. 2002, pp. 1-25.

Chandrasekaran et al., "Streaming Queries over Streaming Data", Proceedings of the 28th VLDB Conference, Hong Kong, China, 2002, 12 pages.

Carney et al., "Monitoring Streams—A New Class of Data Management Applications", Proceedings of the 28th VLDB Conference, Hong Kong, China, 2002, 12 pages.

Kang et al., "Evaluating Window Joins Over Unbounded Streams", Proceedings of the 28th VLDB Conference, Hong Kong, China, 2002, 12 pages.

Madden et al., "Continuously Adaptive Continuous Queries over Streams", Proceedings of the 2002 ACM SIGMOD International Conference on Management of Data, ISBM: 1-58113-497-5, Jun. 4-6, 2002, 12 pages.

Cherniack et al., "Scabable Distributed Stream Processing", Proceedings of the 1st Biennial Conference on Innovative Data Systems Research (CIDR), 2003, 12 pages.

Motwani et al., "Query Processing, Approximation, and Resource Management in a Data Stream Management System", Stanford University, Proceedings of the 1st Biennial Conference on Innovative Data Systems Research (CIDR), 2003, pp. 1-12.

Shah et al., "Flux: An Adaptive Partitioning Operator for Continuous Query Systems", Technical Report CSD-2-1205, http://techreports.1ib.bekeley.edu/accessPages/CSD-02-1205.html, University of California, Berkeley, California, Nov. 15, 2002, pp. 1-15.

Abadi et al., "Aurora: A New Model and Architecture for Data Stream Management", The VLDB Journal—The International Journal on Very Large Daata bases, vol. 12, Issue 2, Aug. 2003, pp. 1-20.

Jin et al., "Relational Subscription Middleware for Internet-Scale Publish Subscribe", DEBS 2003, ACM: 1-58113-843-1, Jun. 8, 2003, pp. 1-8.

* cited by examiner

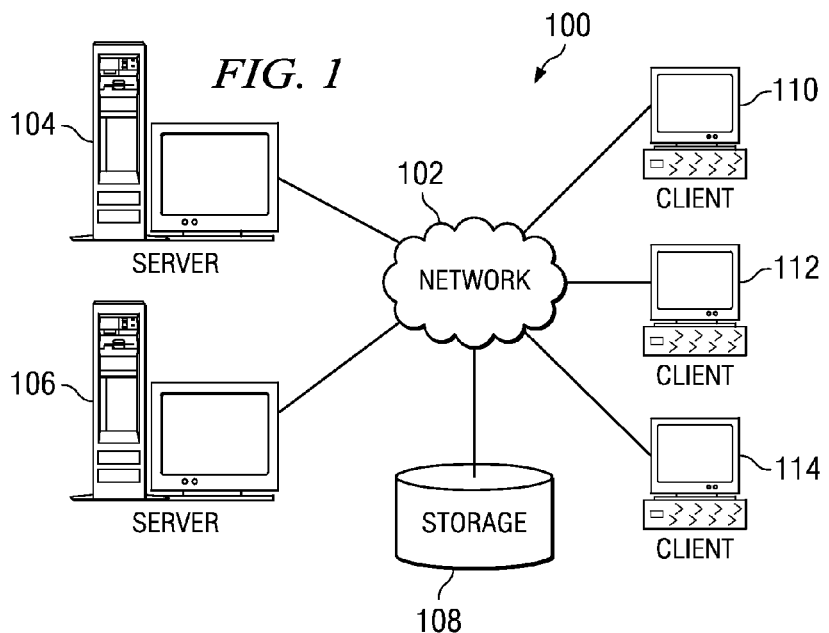
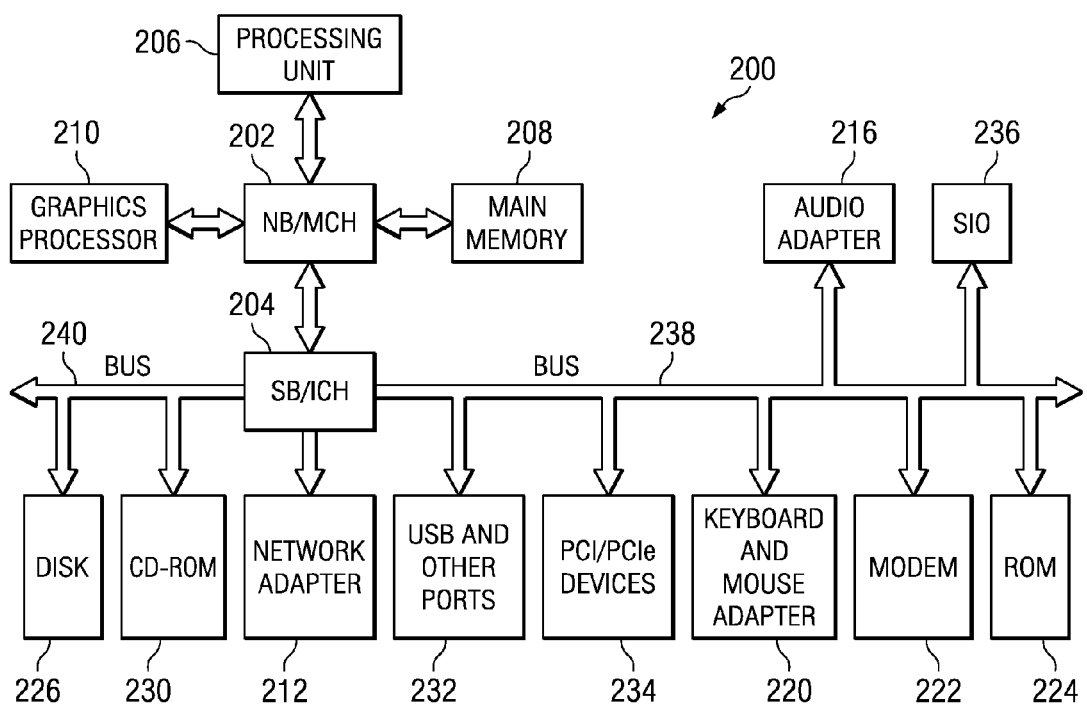

understand # METHOD FOR APPLYING STOCHASTIC CONTROL OPTIMIZATION FOR MESSAGING SYSTEMS This application is a continuation of application Ser. No. 11/474,708, filed Jun. 27, 2006, now abandoned.

BACKGROUND OF THE INVENTION

1. Field of the Invention

The present invention relates generally to stream processing and in particular, to a computer implemented method for processing data streams. Still more particularly, the present invention relates to a computer implemented method, apparatus, and computer usable program code for applying stochastic control optimization to determine lazy versus eager message propagation in distributed stateful messaging systems.

2. Description of the Related Art

Stream processing computing applications are applications in which the data comes into the system in the form of an unbounded sequence or stream of messages, sometimes called "events." Note that the volume of data being processed may be too large to be stored, and intermediate results are typically required before all input messages have arrived. Therefore, the information stream must be processed on the fly. Examples of stream processing computing applications include video processing, audio processing, streaming databases, and sensor networks.

In stream processing systems, producers, also called publishers, deliver streams of events. Consumers, also called subscribers, request continuous updates to results of computations on data from one or more streams. Results are expressions, such as "average trading price of the stocks having the top ten total volume traded." Subscribers define the desired results via a specification, sometimes called a "query." For example, the specification may consist of a continuous query using relational operators, such as join, select, project, aggregation, and top-K and may be expressed in a language, such as structured query language (SQL). Computations on event streams that require data to be retained between messages, such as to compute a running average or sum, are called "stateful computations", and queries requiring stateful computations are called stateful queries.

The stream processing system implements the function of receiving events and computing and propagating changes to the subscribed state by means of a delivery plan, also called a "query execution plan." The delivery plan is implemented as a data flow network of transforms. For example, the network of transforms may be a collection of Java® objects. Each transform accepts messages representing changes to an input to the transform operator, updates a local state, and produces messages representing changes to the result of the transform operator. The changes are then propagated "downstream" towards other transforms in the flow or towards the ultimate consumers. The transforms are deployed on a distributed network of machines called servers or message brokers. When the data flow is distributed over multiple servers, some of the message traffic between one transform and another will flow over a physical connection, such as a TCP-IP connection.

In many stream processing systems, unnecessary messages may be delivered from one transform to the next. Unnecessary is best explained in the context of an exemplary transform in a server A that sends a message to a downstream transform in a server B, only to have that message discarded or ignored. For example, a change to the stock price of issue one may be sent from A to B, but B then ignores it because issue one is not one of the top ten trading stocks. Sending the ignored messages is useless, even resulting in wasted bandwidth, processing power, and memory. If messages are suppressed that turn out later to be needed, the downstream server may have to request additional messages by sending explicit requests to the upstream servers, resulting in delays.

SUMMARY OF THE INVENTION

The illustrative embodiments provide a computer implemented method, apparatus, and computer usable program code for controlling when to send messages in a stream processing system. A policy is determined by utilizing probability statistics and a cost function prior to stream processing. The policy specifies under which conditions a message is sent eagerly and under which other conditions the message is delayed. A filter is operated during stream processing that selects which of the messages to send from a sending transform based upon a threshold. A controller is operated during stream processing that observes a current state of a receiving transform and that applies the policy based on the current state to determine whether to change the threshold.

BRIEF DESCRIPTION OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

FIG. 1 is a pictorial representation of a network of data processing systems in which the illustrative embodiments may be implemented;

FIG. 2 is a block diagram of a data processing system in which the illustrative embodiments may be implemented;

DETAILED DESCRIPTION OF THE PREFERRED EMBODIMENT

Figure 3:
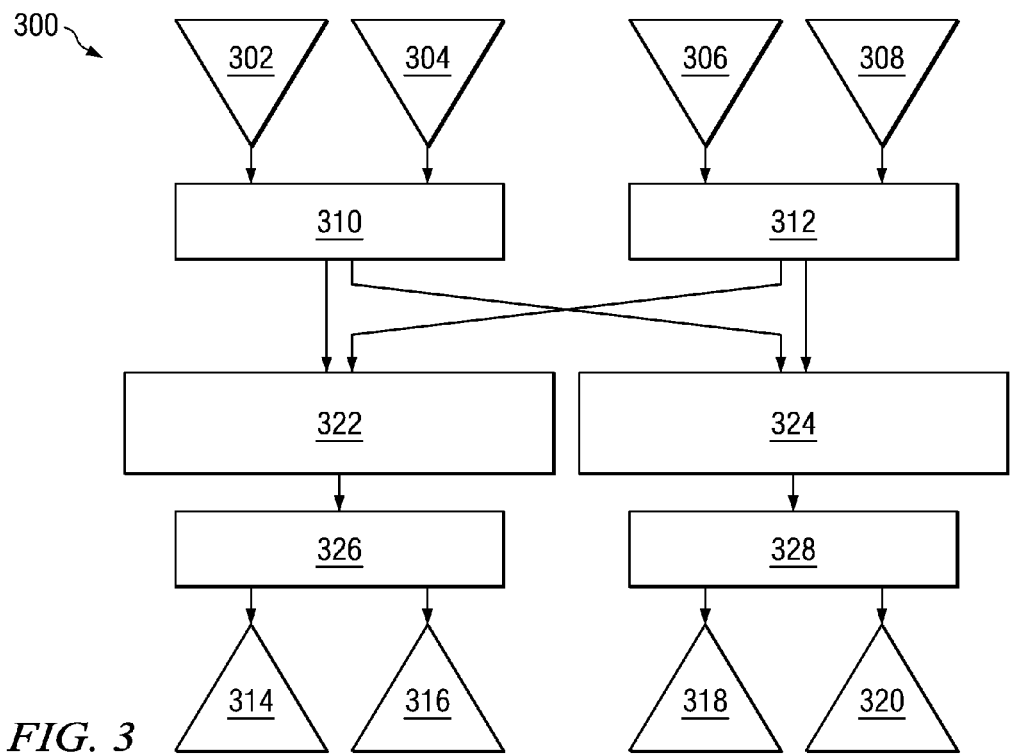
FIG. 3 is an overlay network of servers in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown which could serve as one of the distributed servers in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system. The depicted examples in FIGS. 1-2 and above-described examples are not meant to imply architectural limitations.

Illustrative embodiments provide a computer implemented method, apparatus, and computer usable program code for applying stochastic control optimization to produce efficient and timely delivery of results of queries on streams in distributed stateful messaging systems. The running example of FIG. 3 is used to explain the advantages and an overview of the illustrative embodiments.

FIG. 3 is an overlay network of servers in accordance with an illustrative embodiment. FIG. 3 shows overlay network 300 which may be part of a distributed stream processing system. Overlay network 300 includes producers 302, 304, 306, and 308. Overlay network 300 is a computer network which is built on top of another network. Nodes in overlay network 300 may be thought of as being connected by virtual or logical links, each of which corresponds to a path, perhaps through many physical links, in the underlying network. A producer is a program or device that from time generates "events" or "data messages", such as stock quotes in a financial application or trouble reports in a systems management application. Producers 302, 304, 306, and 308 deliver streams of events to servers 310 and 312. Servers 310 and 312 are frequently referred to as message brokers because servers 310 and 312 transform and propagate messages from producers to subscribing clients 314, 316, 318, and 320. In this example, servers 310 and 312 connect to intermediate servers 322, 324, 326, and 328. For example, the links between nodes in overlay network 300, indicated by server 310 and intermediate server 322, in may be TCP/IP connections over the Internet.

Producers 302, 304, 306, and 308, servers 310 and 312, intermediate servers 322, 324, 326, and 328, and subscribing clients 314, 316, 318, and 320 are operably interconnected by a network, such as network 102 of FIG. 1. Overlay network 300 is used to host a streaming system sometimes referred to as a stateful publish-subscribe system. The streaming system hosts one or more stateful queries from subscribing clients. Stateful queries are expressed in a language, such as structured query language and are compiled down to a flow graph, such as a set of Java® objects called a delivery plan.

The illustrative embodiments present a method for reducing the amount of network traffic over physical connections while maintaining timely delivery of state to subscribers. Many times, unnecessary messages are delivered from one transform to the next in overlay network 300. "Unnecessary" indicates that a transform in a server A sends a message to a downstream transform in a server B, only to have that message discarded or ignored. The message is unnecessary because it did not really need to be sent.

The following running example is used to illustrate the benefits and novelty of a system management application implementing the illustrative embodiments. Multiple streams of messages are published into the system, each containing a problem report that contains a problem identification, a device name, and a severity number. Additional streams contain messages announcing that a particular problem identification has been solved. The continuous query being subscribed to is seeking the device names of those devices whose total severity counts for unsolved problems that are in the top ten from among all devices. Suppose further that the input streams are arriving at multiple servers, and the top-K transform evaluating the top ten device names is located at a downstream server. A top-k transform is for a top-K query. Top-K queries are useful because they continuously report the k largest values that are obtained from distributed data streams. The k largest values are interesting because they tell the subscribing client which devices have the most severe unsolved problems and therefore merit more immediate attention.

In a naïve implementation, each new message indicating a new problem or a solved problem is propagated to the downstream server; however, that is potentially wasteful for many reasons. For example, suppose that there are 1000 devices. Most of them will not be in the highest ten of total severity, so the message changing their severity count will be ignored. It is desirable to suppress sending messages unless they apply to the top ten set or change the top ten set. However, the transforms computing the severity count do not have complete information to decide whether to propagate the message or not because the transforms do not know the boundary between the top ten severities and the rest. If any transform decides to propagate the message eagerly, the transform may have sent a useless message. In contrast, if the transform decides to ignore the message, the transform may have suppressed a needed message, causing the downstream server's state to contain fewer than ten device names. The downstream server would then have to "pull" for more messages by sending explicit requests to the upstream servers, resulting in a delay. Since either choice may cause a bad result, the sender needs to make an "educated guess" based on incomplete information.

The method of the illustrative embodiments exploit three different kinds of information supplied by the system's users: (1) statistical information about the expected frequency of messages including new problems and solved problems, (2) statistical information about the expected distribution of values, such as message severity, and (3) a utility metric or "penalty function" defined by the system administrator that calibrates how undesirable it is to send traffic over a network link versus how undesirable it is to have an unnecessary delay in displaying the result. The statistical information comes from either a mathematical model of the system being monitored or from measurements of prior experience with the system. The utility metric comes from the user's judgment of the relative importance of the two potentially conflicting goals of minimizing delay and minimizing network traffic.

Using the statistics and the utility metric, the system solves offline an infinite horizon stochastic optimization problem to define parameters for a controller that will be executed at run-time. A stochastic control system is modeled as follows: at any instant the system can be in one of a set of possible observable states S. At each tick of time, a controller observes the current state $s_i$, and applies a policy ⑥$(s_i)$ to determine an action u from a set of possible actions U. Given $s_i$ and u, there is a certain probability $p_{ij}(u)$ that the system will move into a next state $s_j$. The system will also incur an expected "cost" or "penalty" g(i,u) based on the user-defined penalty function. This step is repeated at each tick of time. An infinite horizon stochastic optimization problem is: given $p_{ij}(u)$ and g(i,u) as defined above, compute a "best" policy ⑥$_{opt}$, mapping states to actions, such that the expected average penalty per unit time incurred over the long run is minimized.

The solution to this problem is a policy ⑥$_{opt}$ for the controller that minimizes the expected penalty over long term, taking into account the expected use of the system and the relative importance of avoiding wasted bandwidth versus avoiding message delays.

In particular, at execution time, the controller observes a state and adjusts a threshold based upon the pre-computed policy ⑥$_{opt}$. For example, the state may be how many tuples in a top-10 list of names exist, and if there are fewer than ten device names, how long has this count been less than ten. The threshold is used by filters inside the senders as a criterion for whether to propagate messages eagerly or whether to hold them. The illustrative embodiments allow network traffic to be reduced over a physical connection while still maintaining timely delivery of the state to subscribers.

Making a good decision of whether to send a message immediately using "eager" propagation or whether to suppress the message and send it only if explicitly requested using "lazy" propagation is the subject of the illustrative embodiments. Because the propagation decision is based upon incomplete information, the illustrative embodiments use a combination of statistical analysis prior to execution time and dynamic control at execution time to make decisions with the least expected cost over the long run.

Figure 4:
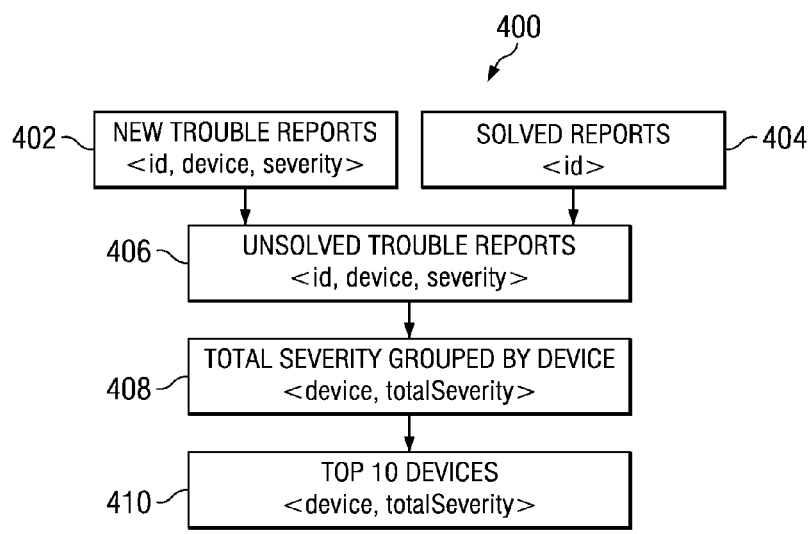
FIG. 4 is an exemplary query execution plan for the stream processing query of the running example in accordance with an illustrative embodiment.

FIG. 4 is an exemplary query execution plan for the stream processing query of the running example in accordance with an illustrative embodiment. Query execution plan 400 is a data flow network that executes on a stream processing engine, such as the servers of overlay network 300 of FIG. 3. Query execution plan 400 shows a flow network of transforms that are part of a delivery plan. As used in the illustrative embodiments, a "transform" is a computational module that computes a function by receiving messages consisting of changes to the transform's inputs and delivers messages consisting of changes to the transform's outputs. Transforms 402 and 404 receive input streams. In this example, transform 402 receives reports of new problems or trouble reports and transform 404 receives solved reports.

Transform 406 joins the new trouble reports and the solved reports, computing the "difference" between the set of all trouble reports and the solved trouble reports. The difference represents the unsolved trouble reports. Transform 408 is an aggregation operator computing the total severity grouped by device name. The output of transform 408 is a collection of tuples, pairing a device name with a total severity, referred to as totalSeverity. The total severity for a particular device name increases each time a new problem for that device identification is encountered. The total severity decreases each time a previous problem with that device name is solved and hence removed.

Transform 410 is a "top-K" operator that takes as input, all tuples produced by transform 408 and delivers only the ten tuples with the highest total severity.

Figure 5:
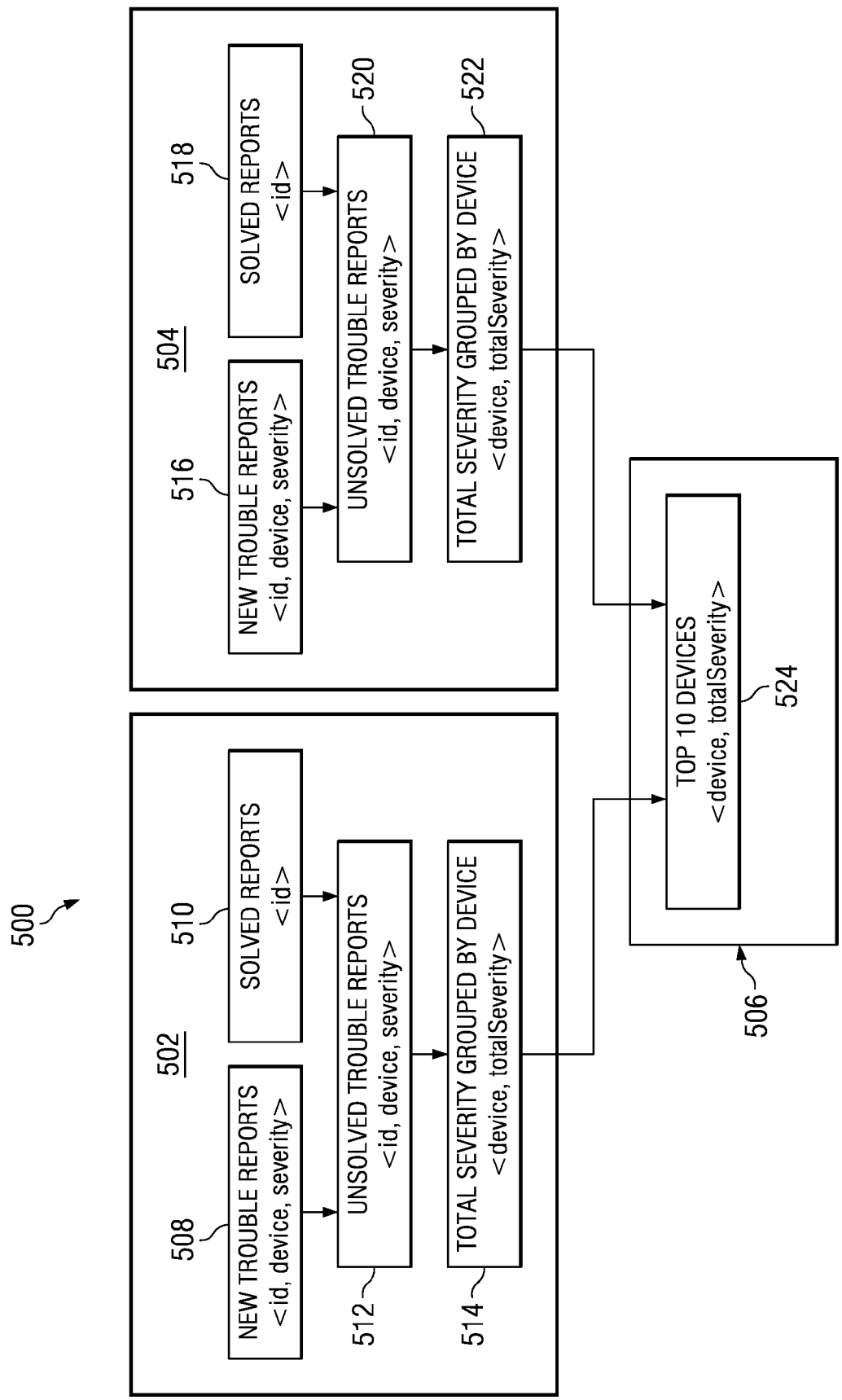
FIG. 5 is an exemplary deployment of a query execution plan onto multiple servers in accordance with an illustrative embodiment.

FIG. 5 is an exemplary deployment of a query execution plan onto multiple servers in accordance with an illustrative embodiment. Distributed deployment 500 shows a possible deployment of a query execution plan, such as query execution plan 400 of FIG. 4 in which some transforms have been replicated and all transforms have been assigned to a system of three servers.

In this example, transforms 402, 404, 406 and 408 of FIG. 4 have been replicated and assigned to servers 502 and 504. Transform 410 of FIG. 4 has been assigned to server 506. Servers 502, 504, and 506 are interconnected by a network. Servers 502, 504, and 506 are message brokers, such as servers 310 and 312 of FIG. 3. Distributed deployment 500 allows problem reports to be delivered to multiple places, such as the East and West coast of the United States. Transforms 508, 510, 512, and 514 have been assigned to server 502. Transforms 516, 518, 520, and 522 have been assigned to server 504.

Transform 524 has been assigned to server 506. Transform 524 is an augmented transform that merges the two input sources from server 502 and server 504 before performing the top-K operator. Transforms 514 and 522 may be referred to as sending transforms because messages are sent from transforms 514 and 522 to transform 524 on server 506. Transform 524 may be referred to as a receiving transform because transform 524 receives messages. Any traffic between transforms 514, 522, and 524 uses bandwidth on a physical network link, such as the link between server 310 to intermediate server 322 of FIG. 3.

The method applied to dealing with a query execution plan may be applied to other queries having similar characteristics, namely: (a) messages travel over a physical link to a downstream transform; (b) many of these messages are ignored once they reach the downstream transform; (c) the sending transform does not have complete information enabling it to know whether or not the receiving transform needs any particular message; (d) a wrong choice either to send or not to send the message may potentially hurt performance and therefore a solution that minimizes the expected performance degradation over the long term is desired.

Figure 6:
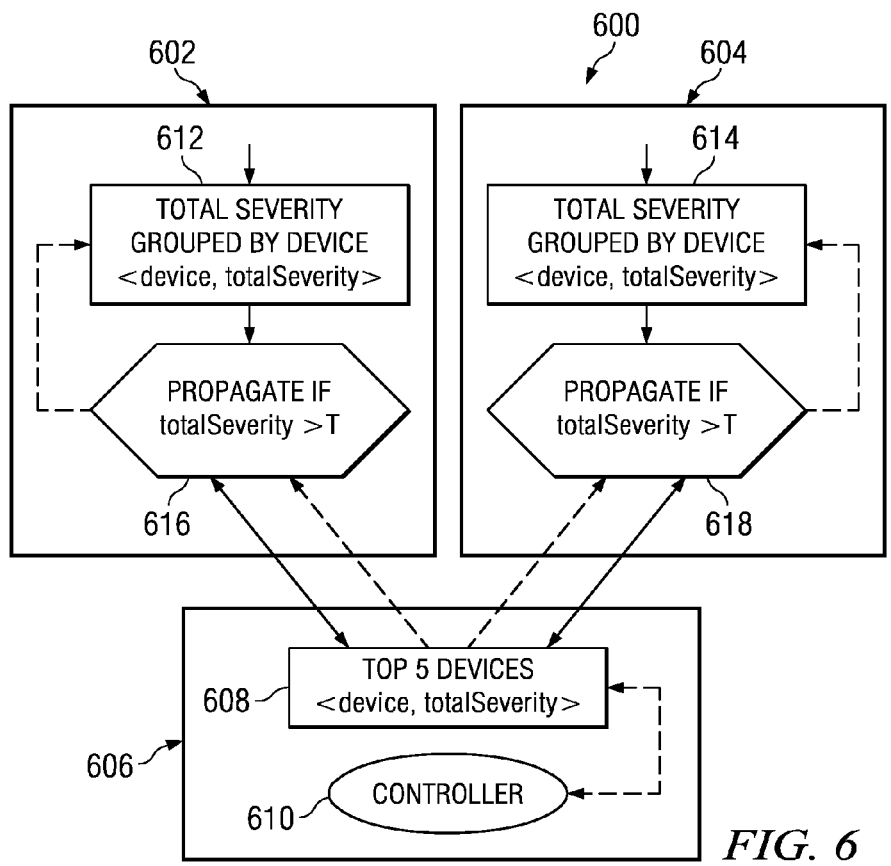
FIG. 6 is the same exemplary deployment of the query execution plan adding upstream threshold-based filters and a downstream controller in accordance with an illustrative embodiment.

FIG. 6 is the same exemplary deployment of the query execution plan adding upstream threshold-based filters and a downstream controller in accordance with an illustrative embodiment. Distributed deployment 600 includes servers 602, 604, and 606, such as servers 502, 504, and 506 of FIG. 5. Downstream transform 608 is a transform, such as transform 524 of FIG. 5 that is assumed to be interconnected with other transforms in a configuration, such as that shown in FIG. 5. According to the teaching of the illustrative embodiments, downstream transform 608 is augmented with controller 610. Upstream transforms 612 and 614 are augmented with threshold-based filters 616 and 618. For purposes of simplicity, FIG. 6 shows only the sending transforms within servers 602 and 604 and the associated filters.

Controller 610 observes a certain state, and based on that state, adjusts a threshold T. The observed state includes how many tuples are currently available at downstream transform 608, and if less than the required ten tuples, how long that condition has persisted. Based on the current state and a fixed policy computed offline, controller 610 makes a decision either to do nothing, to raise threshold T by a designated amount, or to lower threshold T by a designated amount. If controller 610 changes threshold T, controller 610 communicates the new value of threshold T to threshold-based filters 616 and 618.

To simplify the mathematical model and to prevent changes from occurring too rapidly for stability purposes, controller 610 may not change threshold T again for a period of one round trip over the link, that is, until downstream transform 608 has had a chance to observe the effect of the change. Threshold-based filters 616 and 618 suppress sending messages whose values are below the threshold but may retrieve and send them later if threshold T is later lowered.

Figure 7:
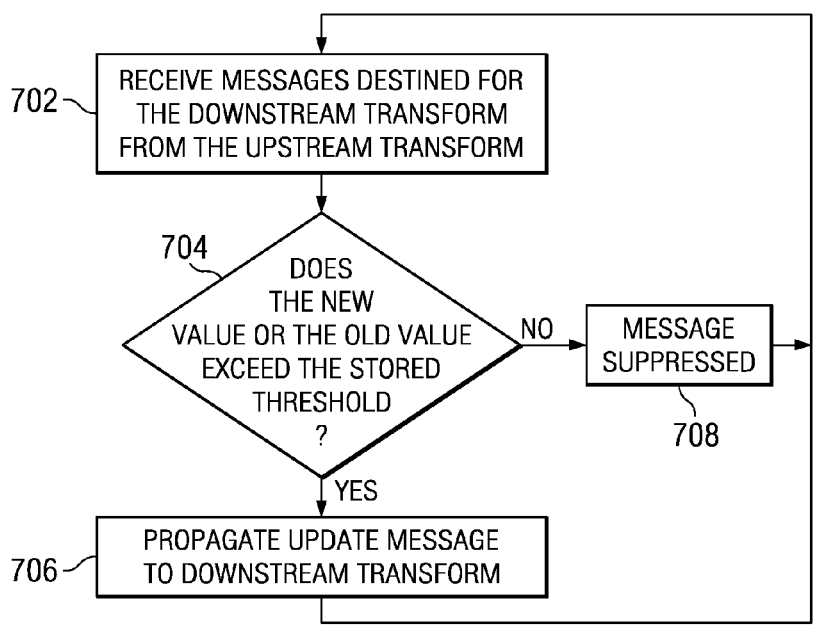
FIG. 7 is a flowchart for a process for defining the behavior of a threshold-based filter in processing messages from an upstream transformation toward a downstream transformation in accordance with the illustrative embodiments.

FIG. 7 is a flowchart for a process for defining the behavior of a threshold-based filter in processing messages from an upstream transformation toward a downstream transformation in accordance with the illustrative embodiments. The process of FIG. 7 may be implemented in a threshold-based filter, such as threshold-based filters 616 and 618 of FIG. 6. The threshold-based filter holds a threshold T set by a controller, such as controller 610 of FIG. 6. Threshold T may be set to an initial value.

The process executes each time the threshold-based filter receives messages destined for the downstream transform from the upstream transform (step 702). The upstream transform and downstream transform may be transforms, such as upstream transform 612 and downstream transform 608 of FIG. 6. In this example query, each message from the upstream transform represents a change or update to a value of the computed column totalSeverity in a tuple, which may be represented, for example, as a pair consisting of a new and an old value of totalSeverity.

Next, the threshold-based filter determines whether the new value or old value in the message exceeds the stored threshold (step 704). The new and old values are the new and old totalSeverity values received by the threshold-based filter in step 702. If the message exceeds the threshold, the update message is propagated to the downstream transform (step 706) before returning again to step 702. If the message does not exceed the threshold in step 704, the message is suppressed (step 708) before returning to step 702.

For example, if either the old or new value of totalSeverity exceeds the stored threshold T previously communicated from the controller in step 702, then the message will be propagated "eagerly" over the link in step 706. A message is sent eagerly by sending the message as soon as possible.

Figure 8:
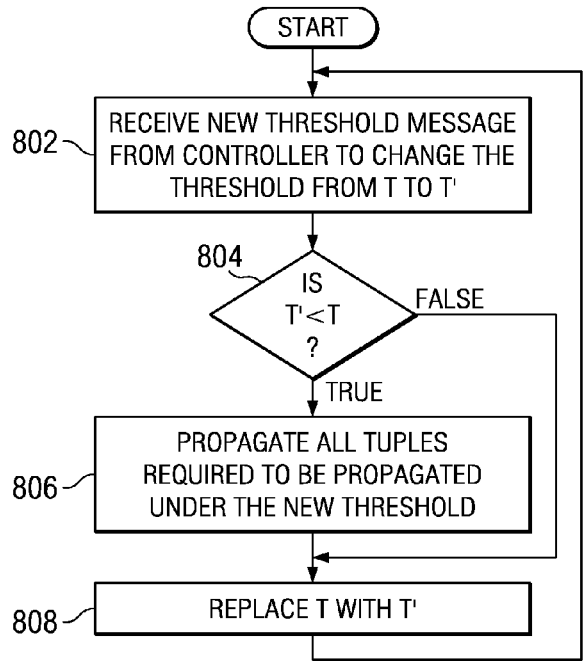
FIG. 8 is a flowchart for a process for defining the behavior of a threshold-based filter in processing threshold changes from a controller in accordance with the illustrative embodiments.

FIG. 8 is a flowchart for a process for defining the behavior of a threshold-based filter in processing threshold changes from a controller in accordance with the illustrative embodiments. The process of FIG. 8 may be implemented in a threshold-based filter, such as threshold-based filters 616 and 618 of FIG. 6.

A threshold-based filter receives a message from the controller to change the threshold from T to a new value T' (step 802). The controller may be a controller, such as controller 610 of FIG. 6. Next, the threshold-based filter determines whether T' is less than T (step 804). If T' is less than T, the process propagates all tuples required to be propagated under the new threshold (step 806). In step 806, the threshold-based filter queries the upstream transform to obtain all tuples with totalSeverity less than T but still greater or equal to T'.

Next, the threshold-based filter replaces threshold T with the new threshold T' (step 808) before returning to step 802. If the threshold-based filter determines T' is greater or equal to T in step 804, the threshold-based filter replaces threshold T with new threshold T' (step 808) before returning to step 802.

Figure 9:
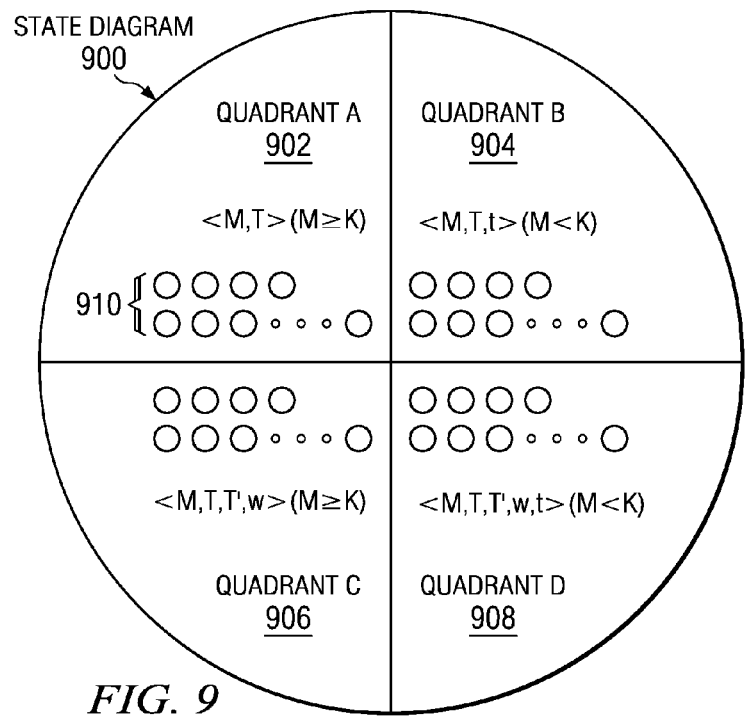
FIG. 9 is a state diagram of the controller as modeled by a Markov model in accordance with an illustrative embodiment.

FIG. 9 is a state diagram of the controller as modeled by a Markov model in accordance with an illustrative embodiment. State diagram 900 of FIG. 9 is part of a mathematical model of the behavior of a controller, such as controller 610 of FIG. 6. This model is used in the offline process described in connection with FIG. 14, in which probabilities $p_{ij}(u)$ will be associated with pairs of states in state diagram 900 for each possible action, and penalty expectations $g(i,u)$ will be associated with these states for each possible action, and in which an optimum policy $\textcircled{6}_{opt}$ will be computed.

State diagram 900 includes quadrant A 902, quadrant B 904, quadrant C 906, and quadrant D 908. Each quadrant includes a finite number of states based upon possible values of the specified parameters. For example, quadrant A 902 includes states 910 that represent a large set of values that fit the parameters of quadrant A 902.

Normally, the state is a pair <M, T>, such as in quadrant A 902 where M is the number (K or more) of tuples visible to the top-K transform, and T is the current value of the threshold. K is the minimum number the top-K transform needs to deliver the transform's result. When M<K, then the state is optionally augmented by a time period t, representing the number of "ticks" for which the top-K transform has been unable to deliver the transform's result. These states are shown in quadrant B 904. A tick is a discrete slice of time used by the model. For example, a tick may be a second, micro-second, processor cycle, or other measurable occurrence.

The augmented state <M,T,t> is only needed if the penalty function is not linear. If the penalty per tick for having less than K values is the same regardless of how many ticks have elapsed, then this additional value is not needed. Only a few distinct states of t are needed to capture the properties of the penalty function. When the controller has just changed the threshold from T to T', the controller is blocked from changing the threshold again for one round-trip delay time which will be represented as some number of ticks. During this blocked phase, the controller has a state <M,T,T',w> in quadrant C 906 (if M>=K) or a state <M,T,T',w,t> in quadrant D 908 (if M<K), where w simply advances from 1 to $w_{max}$ and the controller may not make any decisions. The states in quadrants C and D are called "blocked states." States in quadrant A 902 indicate <M,T> (M>=K), states in quadrant B 904 indicate <M,T,t> (M<K), states in quadrant C 906 indicates <M,T,T',w> (M>=K), and states in quadrant D 908 indicates <M,T,T',w,t> (M<K).

Figure 10:
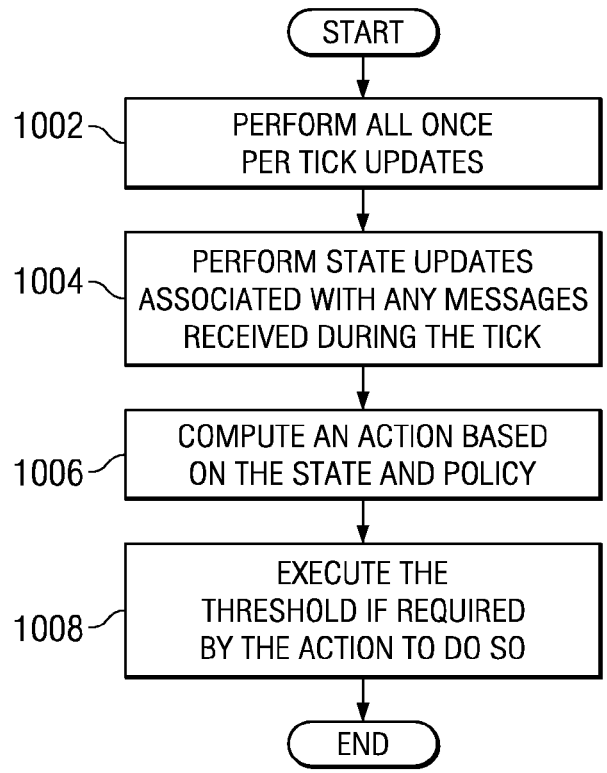
FIG. 10 is a flowchart for a process defining the behavior of a controller in accordance with an illustrative embodiment.

FIG. 10 is a flowchart for a process defining the behavior of the controller in accordance with an illustrative embodiment.

The process of FIG. 10 may be implemented in a controller, such as controller 610 of FIG. 6. The controller is a device for regulating a system. The controller observes a state, and based on the state, performs an action.

The controller has the ability to observe the current state, which may be state within quadrant A 902 in which <M, T> where M>=K), or a state in quadrant B 904, quadrant C 906, and quadrant D 908 all of FIG. 9. The controller additionally, has a policy which maps a state to an action. The policy is computed off-line before deployment as further described in FIG. 14.

At every tick of time, the process of FIG. 10 is executed. First, the controller performs all once per tick updates (step 1002). As a result of this step, the updated state may include new values of t and w if present. The process of step 1002 is further described in FIG. 11.

Next, the controller performs state updates associated with any messages received during the tick (step 1004). The process of step 1004 is further described in FIG. 12.

Next, the controller computes an action based on the state and policy (step 1006). A policy, as defined earlier, is a mapping from state to action. For every possible state, the policy says what action to perform. At each tick of time, the controller observes the state and looks up in the controller's policy what action to take in that state. As described, the policy will have been previously computed offline by solving an optimization problem and deployed into the controller before execution time. The controller computes the action based on the state and the policy. The action may be "No action", "increment threshold by n", or "decrement threshold by n." In the blocked state, the action is always "no action". No action is performed for states in quadrant C and quadrant D. A policy is used to determine no action/+n/−n for states in quadrant A and quadrant B.

The controller then executes the computed action by updating and communicating the threshold, if required by the action to do so (step 1008) with the process for that tick terminating thereafter. The process of step 1008 is further described in FIG. 13.

Figure 11:
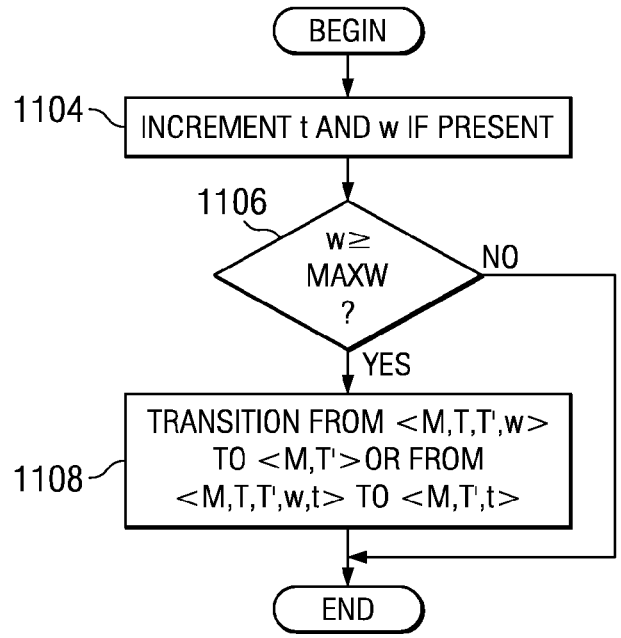
FIG. 11 is a flowchart for a process defining the behavior of the part of the controller in accordance with an illustrative embodiment.

FIG. 11 is a flowchart for a process defining the behavior of the part of the controller in accordance with an illustrative embodiment. In particular, the process of FIG. 11 is a more detailed explanation of step 1002 of FIG. 10 and is triggered once per tick. The process begins as the controller increments t and w if present (step 1104). Next, the controller determines whether w has reached MaxW (step 1106). w and MaxW are represented by ticks. If the controller determines w has reached MaxW in step 1106, the controller transitions states from the blocked state <M, T, T', w> to the non-blocked state <M, T'> or from the blocked state <M, T, T', w, t> to the non-blocked state <M, T', t> (step 1108) with the process terminating thereafter. If the controller determines w has not reached MaxW in step 1106, the process terminates.

Figure 12:
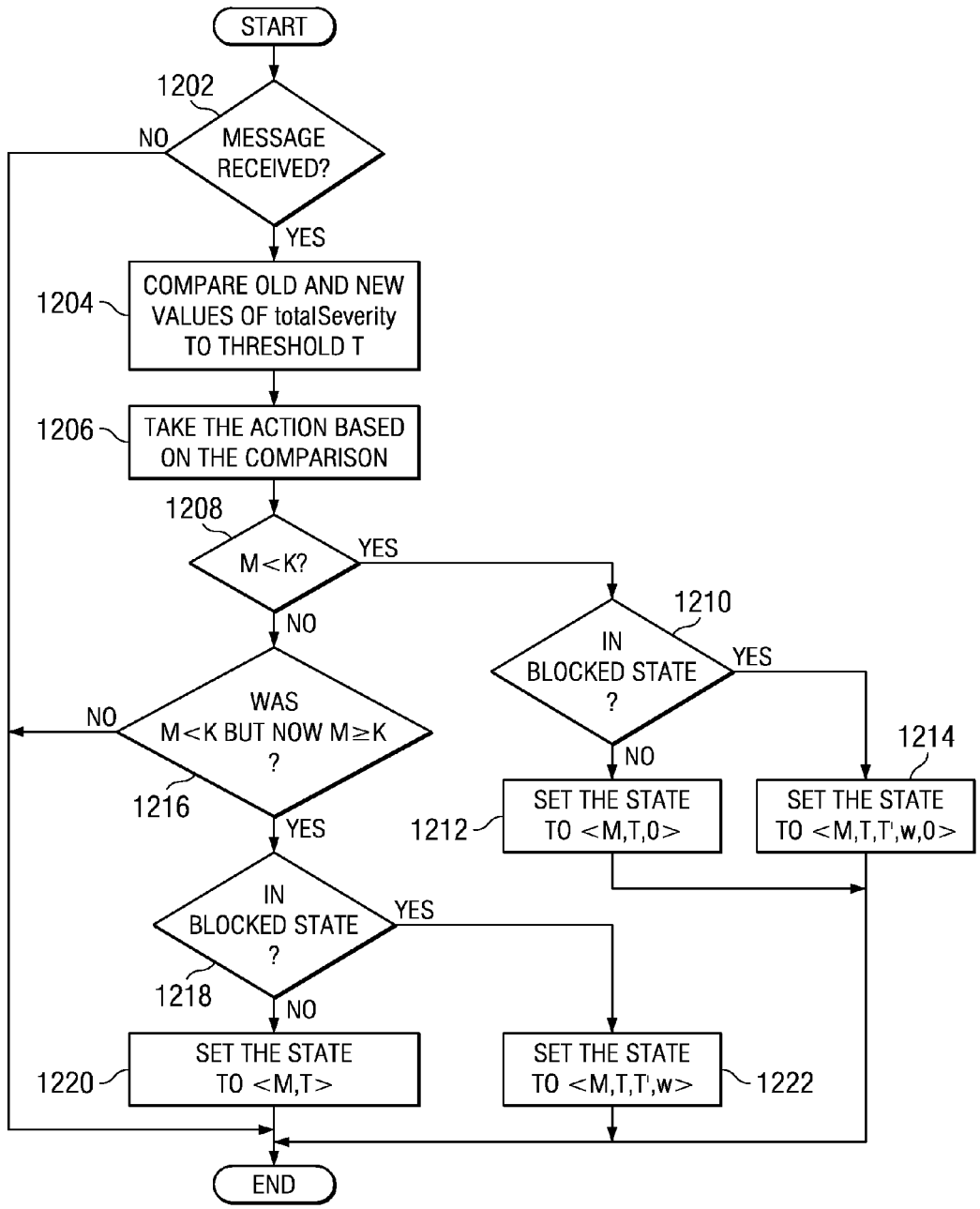
FIG. 12 is a flowchart for a process defining the behavior of part of the controller in accordance with an illustrative embodiment.

FIG. 12 is a flowchart for a process defining the behavior of part of the controller in accordance with an illustrative embodiment. In particular, the process of FIG. 12 is a more detailed explanation of step 1004 of FIG. 10. The controller determines whether a message is received (step 1202). If the controller determines a message is not received, the process ends. If the controller determines a message or batch of messages is received in step 1202, the old and the new values of totalSeverity are compared to threshold T (step 1204). Step 1204 is repeated for each message received. During the blocked period, the future threshold T' is compared. Next, the controller takes an action based on the comparison (step 1206). The actions of step 1206 for each comparison are:

1. Both old and new values of totalSeverity are at or above the threshold: process normally, count of M remains the same.

2. Old value is below threshold and new value is at or above it. Create a new tuple, count of M increases by one.

3. Old value is at or above threshold and new value is below it: Discard existing tuple, count of M decreases by one.

4. Both old and new values are below threshold: Message will be ignored. This case normally will not occur but may happen if the threshold increased, but the message was sent before the sender learned of the change.

Next, after the action is finished for each message, the controller determines whether M<K (step 1208). If M<K, the process determines whether the controller is in a blocked state (step 1210). If the controller is not in a blocked state, the controller sets the state to <M, T, 0> (step 1212), with the process terminating thereafter. If the controller is in a blocked state, the controller sets the state to <M, T, T',w,0> (step 1214), with the process terminating thereafter.

If M>=K in step 1208, the controller determines whether previously M<K, but now M>=K (step 1216). If previously M<K, but now M>=K, the controller determines whether the controller is in a blocked state (step 1218). If the controller is not in a blocked state, the controller sets the state to <M, T>, (step 1220), with the process terminating thereafter. If the controller is in the blocked state in step 1218, the controller sets the state to <M, T, T', w> (step 1222), with the process terminating thereafter. Returning to step 1216, if previously M<K, but now M>=K is not true, the process terminates.

Figure 13:
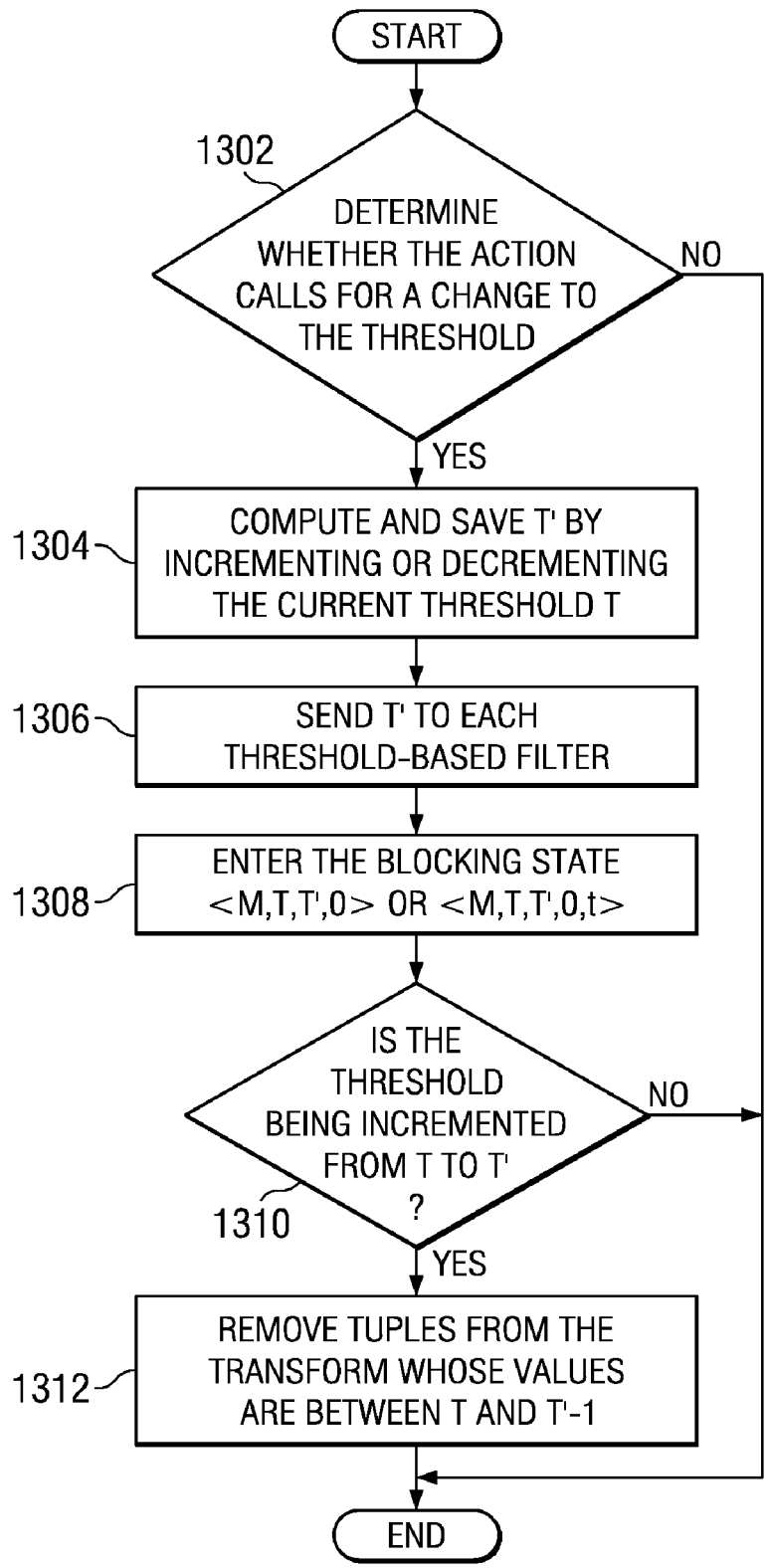
FIG. 13 is a flowchart for a process defining the behavior of part of a controller in accordance with an illustrative embodiment.

FIG. 13 is a flowchart for a process defining the behavior of part of the controller in accordance with an illustrative embodiment. In particular, the process of FIG. 13 is a more detailed explanation of step 1008 of FIG. 10. The process begins with the controller determining whether the action calls for a change to the threshold (step 1302). If the action calls for a change, the controller computes and saves T' by incrementing or decrementing the current threshold T (step 1304). Next, the controller sends T' to each threshold-based filter (step 1306). The threshold-based filter of step 1306 may be filters, such as threshold-based filters 616 and 618 of FIG. 6. Next, the process enters the blocking state <M,T,T',0> or <M,T,T',0,t> (step 1308). The state is selected wherein the values of M that are less than K have the extra parameter t.

Next, the controller determines if the threshold is being incremented from T to T' (step 1310). If the controller is being incremented from T to T', the controller removes tuples from the transform whose values are between T and T'−1 (step 1312) with the process terminating thereafter. Returning again to step 1302, if the controller determines the threshold is not being incremented from T to T' in step 1310, the process terminates. If the controller determines there is no action to change the threshold in step 1302, the process terminates.

Figure 14:
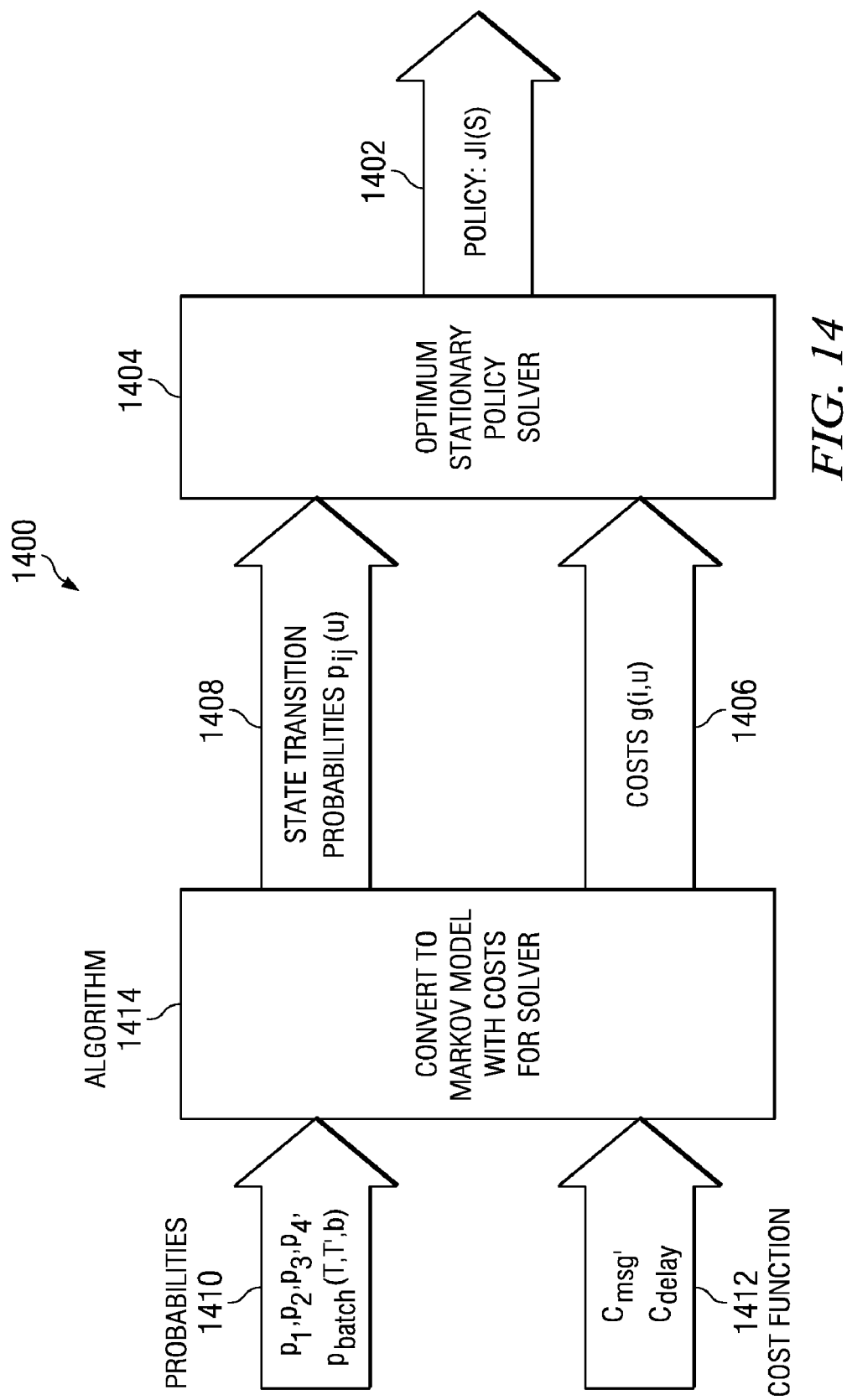
FIG. 14 is a block diagram of the offline process of computing a policy in accordance with an illustrative embodiment.

FIG. 14 is a block diagram of the offline process of computing a policy in accordance with an illustrative embodiment. Offline process 1400 describes the creation of the inputs to an infinite horizon stochastic optimization problem, solving that problem and deploying the resulting optimal policy. In one example, the infinite horizon stochastic optimization problem is solved using well known control theory solutions, such as Bellman's recurrence equation. Offline process 1400 illustrates the procedure that executes offline prior to deployment to compute policy 1402 that is used during execution by the controller, such as controller 610 of FIG. 6. Offline process 1400 may be implemented in a server, such as server 104 of FIG. 1.

Policy 1402 is a function i(s) that maps a state s to an action u. The blocked states always map to the action "No action." There are known algorithms, such as optimum stationary policy solver 1404 for finding an optimum "stationary policy" provided that the set of states and actions may be modeled as a Markov process and provided that each transition may be associated with cost function 1406. The controller is modeled as a finite-state Markov process. A Markov process is one where for a given state $s_i$ and action a, there is a set of probabilities $p_{ij}(a)$ for each of the possible next states $s_j$. An optimum stationary policy is one that depends only on the state and not on the current time. The stationary policy minimizes the expected cost per unit time over an infinite run of the system. The inputs to such an algorithm are the following:

State transition probabilities 1408—$p_{ij}(u)$—for any action u that may be chosen in state $s_i$, the probability that in the next tick the system will be in state $s_j$, where $$\sum_j p_{ij}(u) = 1.$$

Costs 1406 g(i,u)—the cost or penalty associated with taking action u in state $s_i$, where g(i,u) may be an average of all the possible outcomes weighted by their respective probabilities.

States may be states, such as the states within quadrant A 902, quadrant B 904, quadrant C 906, and quadrant D 908 of FIG. 9.

For each of the four categories of state, offline process 1400 illustrates how probabilities 1410 and cost function 1412, including statistics and cost information respectively, are used by algorithm 1414 to produce state transition probabilities 1408 and costs 1406 required by optimum stationary policy solver 1404.

In state <M, K>, there is a certain probability $p_1$ of receiving a new problem report and a certain probability $p_2$ of receiving a solution to a problem. Typically, the creation and solution of problem reports will be modeled as a "birth-death" process. For example, there is a probability of generating a problem that is independent of how many problems exist. There is also a probability of solving a given problem that is proportional to the number of problems currently "alive" or unsolved. Various new problem reports cause the totalSeverity to jump from below to above the threshold. Probability $p_3$, depending on T, is obtained by looking at the distribution of totalSeverity and the distribution of individual severities of reports.

Similarly, various problem reports cause the totalSeverity to jump from above to below the threshold with probability $p_4$ (which will also depend on T). For the action "no Action", the new state is <M+1,T> with state transition probability $p_1p_3$, and state <M−1,T> with probability $p_2p_4$, except if M−1<K, the new state will be <M−1,T,0>, otherwise the state will remain <M,T>. For the action "increase or decrease threshold by n", the new state will be <M+1,T,T±n,0>, <M−1,T,T±n, 0>, or <M+1,T,T±n,0,0> if M−1<K or <M+1,T,T±n,0>), with the same relative probabilities. To compute the cost g(i,u), the assumption is made that the user has supplied a penalty per message sent called $C_{msg}$. The cost for the state is $C_{msg}$ weighted by the probability that a message will be sent: $C_{msg}(p_1p_3+p_2p_4)$. If the action taken is to change the threshold, there is an additional cost $xC_{msg}$ to send a control message to each of the x threshold-based filters. For example, x=2 in the current example.

<M,T,t> where M<K: The formula for the probabilities of the state transitions are the same. If the new state still has M<K, then t increases by one; otherwise the state will not have at component. It is assumed that the user has supplied a penalty representing the cost per tick of remaining in this state: $C_{delay}(t)$. The total cost per tick of remaining in this state is $C_{delay}(t)+C_{msg}(p_1p_3+p_2p_4)$ if no action is taken and $C_{delay}(t)+C_{msg}(p_1p_3+p_2p_4)+xC_{msg}$ if control messages are sent.

<M,T,T',w>: This is a "blocked" state when the controller is forbidden to make any decision other than "No action." Of course messages may be received, incrementing or decrementing the value of M with the same probabilities and costs as before. For $w<w_{max}$, if M increases, the new state is <M+1, T,T',w+1>. If M stays the same, the new state is <M,T,T',w+1>, and if M decreases, the new state is <M−1,T,T',w+1>, unless M−1<K, in which case the new state is <M−1,T,T',w+1,0>. For $w=w_{max}$, the blocking interval will expire. For an increase of threshold, the next state will be <M,T>. For a decrease of threshold, there is a possibility that the controller will additionally receive a batch of new messages from the filters that had values between the old and new threshold. Messages may be received according to step 1202 of FIG. 12. The new state will increase its M by an additional value b and be distributed according to the probability $p_{batch}(T,T',b)$ that a change from T to T' will release b messages. This probability comes from a probability distribution function of message values and the birth-death model of problem reports. For each possible value of b, the new state will be <M+b−1,T'> with probability $p_2p_4p_{batch}(T,T',b)$ and the state becomes <M+b+1,T'> with probability $p_1p_3p_{batch}(T,T',b)$, and the state becomes <M+b,T'> with probability $(1-p_1p_3-p_2p_4)p_{batch}(T,T',b)$. The cost will be $$C_{msg}(p_1p_3+p_2p_4)+\sum_{b>0}bC_{msg}P_{batch}(T,T',b).$$

An exception provides that if b=0 and M−1<K, the state becomes <M−1,T',0>.

<M,T,T'>: This is a blocked state handled identically to the above, except that M<K so there is an additional t component added to the state, and there is an additional $C_{delay}(t)$ contribution to the cost.

Offline process 1400 models or measures parameters $p_1$, $p_2$, $p_3$, $p_4$, $p_{batch}(T,T',b)$ referred to as probabilities 1410. Probabilities 1410 are statistics showing the frequency and distribution of the values of messages and are an input into algorithm 1414. The relative penalties for message transmission and delay $C_{msg}$ and $C_{delay}$ are inputs into algorithm 1414 and are referred to as cost function 1412. Algorithm 1414 executes the rules specified to create the inputs, state transition probabilities 1408 $p_{ij}(u)$, and costs 1406 g(i,u) to Optimum stationary policy solver 1404.

A stationary policy is defined as one where the action depends only on the state, not on the current time. As previously described, an optimum stationary policy is one that minimizes the expected value of the penalty function, and the policy is determined by applying one of several known computational procedures for infinite horizon problems.

Optimum stationary policy solver 1404 generates policy 1402. Policy 1402 is passed to a controller, such as controller 610 of FIG. 6 for use at execution time.

It is understood that someone skilled in the art of dynamic programming may reduce the state space and hence the analysis time for the optimization problem by substituting discrete values of T, T' into ranges by replacing individual ticks t of wait time by epochs and by other straightforward simplifications.

The illustrative embodiments differ from other approaches to avoiding wasted messages in that: (a) the illustrative embodiments apply to stateless, not stateful transforms, such as publish-subscribe systems where the subscriptions are all filters of published messages, (b) the question of whether to propagate eagerly or not does not depend upon the state of the downstream operation, (c) the illustrative embodiments use stochastic control theory.

Thus, the illustrative embodiments provide a distinguishable method to: (a) gather information ahead of time about the statistical behavior of the system, such as the rates of messages and the distribution of the message values, (b) supply a utility function that gives numerical weights to the relative utility of wasted messages versus delay, and (c) use the information from (a) and (b) to solve a stochastic optimization problem, that provides parameters to a controller which at execution time decides when to send messages immediately and when to delay sending them.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for controlling when to send messages in a stream processing system, the computer implemented method comprising:

determining a policy utilizing probability statistics and a cost function, wherein the policy specifies a first set of conditions for sending a message immediately from an upstream transform in an upstream server device to a downstream transform in a downstream server device via a network link and a second set of conditions for suppressing sending the message from the upstream transform in the upstream server device to the downstream transform in the downstream server device via the network link;

setting by the downstream transform in the downstream server device a threshold for upstream filtering of the messages sent from a plurality of upstream transforms in a plurality of upstream server devices to the downstream transform in the downstream server device based upon the policy;

sending by the downstream transform in the downstream server device the threshold for the upstream filtering of the messages to the plurality of upstream transforms in the plurality of upstream server devices via the network link;

filtering the messages by the plurality of upstream transforms in the plurality of upstream server devices during stream processing by selecting which of the messages to send from the plurality of upstream transforms based upon the threshold for the upstream filtering sent by the downstream transform in the downstream server device; and determining by the downstream transform in the downstream server device whether to change the threshold for the upstream filtering by the plurality of upstream transforms in the plurality of upstream server devices during the stream processing based on a current state of the downstream transform, wherein the current state is one of a plurality of states that include the threshold for the upstream filtering, a number of tuples currently available for the downstream transform, a penalty for having fewer than a predetermined number of tuples currently available for the downstream transform during a unit of time, and a number of time units during which the downstream transform has fewer than the predetermined number of tuples, and wherein the penalty is based upon the number of time units during which the downstream transform has fewer than the predetermined number of tuples.

2. The computer implemented method of claim 1, wherein the probability statistics specify a frequency and a distribution of values representing changes in tuples contained in the messages.

3. The computer implemented method of claim 1, wherein the plurality of upstream server devices and the downstream server device are part of a distributed network of servers.

4. The computer implemented method of claim 1, further comprising:

receiving user input specifying the cost function, wherein the cost function indicates relative weights given to a cost of sending messages weighed against a cost of delaying delivering messages to clients.

5. The computer implemented method of claim 1, wherein the determining a policy step further comprises:

solving by a server device offline an infinite horizon stochastic optimization problem utilizing the probability statistics and the cost function to determine an optimum policy that minimizes average cost per stage.

6. The computer implemented method of claim 5, wherein the solving step comprises:

using Bellman's recurrence equation.

7. The computer implemented method of claim 5, wherein the optimum policy is chosen to minimize an expected cost per time period based on a weighted sum of costs due to message traffic and costs due to delays.

8. The computer implemented method of claim 1, wherein the plurality of states include a weighted sum of a number of messages associated with the cost function during the unit of time.

9. The computer implemented method of claim 5, wherein the cost function is supplied by a user, and wherein the optimum policy maps the current state to a decision whether and how much to change the threshold.

10. The computer implemented method of claim 1, wherein each tuple includes a new value and an old value for a computed value, and wherein both the new value and the old value for the computed value included in the tuple are compared with the threshold for the upstream filtering, and wherein when either the new value or the old value for the computed value exceeds the threshold for the upstream filtering the message is sent immediately from the upstream transform in the upstream server device to the downstream transform in the downstream server device via the network link.

11. A data processing system for controlling when to send messages, comprising:

a storage device, wherein the storage device stores a set of instructions; and a processing unit, wherein the processing unit executes the set of instructions to determine a policy utilizing probability statistics and a cost function, wherein the policy specifies a first set of conditions for sending a message immediately from an upstream transform in an upstream server device to a downstream transform in a downstream server device via a network link and a second set of conditions for suppressing sending the message from the upstream transform in the upstream server device to the downstream transform in the downstream server device via the network link; set by the downstream transform in the downstream server device a threshold for upstream filtering of the messages sent from a plurality of upstream transforms in a plurality of upstream server devices to the downstream transform in the downstream server device based upon the policy; send by the downstream transform in the downstream server device the threshold for the upstream filtering of the messages to the plurality of upstream transforms in the plurality of upstream server devices via the network link; filter the messages by the plurality of upstream transforms in the plurality of upstream server devices during stream processing by selecting which of the messages to send from the plurality of upstream transforms based upon the threshold for the upstream filtering sent by the downstream transform in the downstream server device; and determine by the downstream transform in the downstream server device whether to change the threshold for the upstream filtering by the plurality of upstream transforms in the plurality of upstream server devices during the stream processing based on a current state of the downstream transform, wherein the current state is one of a plurality of states that include the threshold for the upstream filtering, a number of tuples currently available for the downstream transform, a penalty for having fewer than a predetermined number of tuples currently available for the downstream transform during a unit of time, and a number of time units during which the downstream transform has fewer than the predetermined number of tuples, and wherein the penalty is based upon the number of time units during which the downstream transform has fewer than the predetermined number of tuples.

12. The data processing system of claim 11, wherein the policy is determined by the processing unit by solving offline an infinite horizon stochastic optimization problem utilizing the probability statistics and the cost function.

13. The data processing system of claim 12, wherein an optimum policy that is determined from solving offline the infinite horizon stochastic optimization problem specifies parameters for a controller within the downstream transform in the downstream server device, wherein the parameters are executed at run-time to determine how the messages are sent.

14. The data processing system of claim 11, wherein the cost function calibrates how undesirable it is to send traffic over the network link versus how undesirable it is to have an unnecessary delay in displaying a result.

15. The data processing system of claim 13, wherein at each unit of time, the controller observes states and applies the policy to the current state to compute an action from a set of possible actions.

16. A non-transitory computer readable medium encoded with computer executable instructions for controlling messages in a stream processing system, the non-transitory computer readable medium comprising: computer executable instructions for determining a policy utilizing probability statistics and a cost function, wherein the policy specifies a first set of conditions for sending a message immediately from an upstream transform in an upstream server device to a downstream transform in a downstream server device via a network link and a second set of conditions for suppressing sending the message from the upstream transform in the upstream server device to the downstream transform in the downstream server device via the network link; computer executable instructions for setting by the downstream transform in the downstream server device a threshold for upstream filtering of the messages sent from a plurality of upstream transforms in a plurality of upstream server devices to the downstream transform in the downstream server device based upon the policy; computer executable instructions for sending by the downstream transform in the downstream server device the threshold for the upstream filtering of the messages to the plurality of upstream transforms in the plurality of upstream server devices via the network link; computer executable instructions for filtering the messages by the plurality of upstream transforms in the plurality of upstream server devices during stream processing by selecting which of the messages to send from the plurality of upstream transforms based upon the threshold for the upstream filtering sent by the downstream transform in the downstream server device; and computer executable instructions for determining by the downstream transform in the downstream server device whether to change the threshold for the upstream filtering by the plurality of upstream transforms in the plurality of upstream server devices during the stream processing based on a current state of the downstream transform, wherein the current state is one of a plurality of states that include the threshold for the upstream filtering, a number of tuples currently available for the downstream transform, a penalty for having fewer than a predetermined number of tuples currently available for the downstream transform during a unit of time, and a number of time units during which the downstream transform has fewer than the predetermined number of tuples, and wherein the penalty is based upon the number of time units during which the downstream transform has fewer than the predetermined number of tuples.

17. The non-transitory computer readable medium of claim 16, wherein the probability statistics include statistical information about an expected frequency of each input message.

18. The non-transitory computer readable medium of claim 16, further comprising: computer executable instructions for receiving user input specifying the cost function, wherein the cost function indicates relative weights given to a cost of sending messages weighed against a cost of delaying delivering messages to clients.

19. The non-transitory computer readable medium of claim 16, wherein the computer executable instructions for determining a policy further comprises: computer executable instructions for solving offline an infinite horizon stochastic optimization problem utilizing the probability statistics and the cost function to determine an optimum policy that minimizes average cost per stage.

20. The non-transitory computer readable medium of claim 16, further comprising: computer executable instructions for determining a utility metric in the policy specifying how undesirable it is to send traffic over the network link versus how undesirable it is to have an unnecessary delay in displaying a result.

* * * * *